US 9,201,958 B2

(12) United States Patent
Yang et al.

(10) Patent No.: US 9,201,958 B2
(45) Date of Patent: Dec. 1, 2015

(54) VIDEO OBJECT RETRIEVAL SYSTEM AND METHOD

(71) Applicant: TCL RESEARCH AMERICA INC., Santa Clara, CA (US)

(72) Inventors: Yimin Yang, Santa Clara, CA (US); Haohong Wang, Santa Clara, CA (US)

(73) Assignee: TCL RESEARCH AMERICA INC., Santa Clara, CA (US)

( * ) Notice: Subject to any disclaimer, the term of this patent is extended or adjusted under 35 U.S.C. 154(b) by 163 days.

(21) Appl. No.: 14/062,017

(22) Filed: Oct. 24, 2013

(65) Prior Publication Data
US 2015/0117772 A1  Apr. 30, 2015

(51) Int. Cl.
G06K 9/46 (2006.01)
G06F 17/30 (2006.01)
G06K 9/62 (2006.01)

(52) U.S. Cl.
CPC .......... G06F 17/3079 (2013.01); G06K 9/4642 (2013.01); G06K 9/4652 (2013.01); G06K 9/6215 (2013.01)

(58) Field of Classification Search
USPC .................. 382/162, 165, 173, 305
See application file for complete search history.

(56) References Cited

U.S. PATENT DOCUMENTS 8,027,550 B2 * 9/2011 Chen et al. .................... 382/305

FOREIGN PATENT DOCUMENTS

CN        1365067 A    8/2002
CN       101789005 A    7/2010

* cited by examiner

*Primary Examiner* — Duy M Dang
(74) *Attorney, Agent, or Firm* — Anova Law Group, PLLC (57) ABSTRACT

A video object retrieval method is provided. The method includes dividing an input video into a number of video shots and detecting target-class object occurrences and related-class object occurrences in each video shot. The method also includes pre-processing object bounding box images and performing automatic object extraction. Further, the method includes performing object-level feature extraction and integration and generating visual search results based on similarity scores.

16 Claims, 5 Drawing Sheets

VIDEO OBJECT RETRIEVAL SYSTEM AND METHOD

FIELD OF THE INVENTION

The present invention relates to the field of computer technologies and, more particularly, to techniques for a video object retrieval system.

BACKGROUND

Object retrieval systems have been quite popular in today's commercial and entertainment businesses. For example, it is not unusual that a user is interested in finding the same or similar object that appears in the video he/she just watched. Traditional content-based image retrieval (CBIR) efforts focus on bridging the gap between low-level image features and high-level semantics by analyzing the whole content of static images without considering human interest. To put more emphasize on the potential object region, some methods have been made to approach human perception system by segmenting images into regions and model the image content via so-called region-based local features, but the performance of these methods is far from satisfactory due to the limitation of segmentation techniques and the obstacle of salient object identification especially when multiple objects are involved.

The difficulty of the retrieval task escalates into another level when dealing with frames from digital videos instead of static images because videos are usually filmed under various lighting conditions in an unconstrained manner. Specifically, there are three major difficulties for the task of video object retrieval. First, the potential objects of user interest in videos have an extremely noisy background with numerous variances such as deformation, occultation, rotation, scale, affine transform, and translation. Second, how to describe and represent the content in an image (video frame) to effective and efficiently is very critical for precisely retrieving the exact or similar object appeared in the video. Finally, the evaluation of an image retrieval system is relative subjective and lacks a widely acknowledged standard, which makes the improvement of object retrieval task even harder.

The disclosed methods and systems are directed to solve one or more problems set forth above and other problems.

BRIEF SUMMARY OF THE DISCLOSURE

One aspect of the present disclosure includes a video object retrieval method. The method includes dividing an input video into a number of video shots and detecting target-class object occurrences and related-class object occurrences in each video shot. The method also includes pre-processing object bounding box images and performing automatic object extraction. Further, the method includes performing object-level feature extraction and integration and generating visual search results based on similarity scores.

Another aspect of the present disclosure includes a video object retrieval system. The video object retrieval system includes an object detection module configured to detect target-class object occurrences and related-class object occurrences in each video shot. The video object retrieval system also includes a preprocessing module configured to pre-process object bounding box images. Further, the video object retrieval system includes an object extraction module configured to perform automatic object extraction via automatic grab-cut algorithm. The video object retrieval system also includes an object-level feature extraction module configured to perform object-level feature extraction. The video object retrieval system includes a similarity computation module configured to compute the ACC feature similarity and the CEDD feature similarity. In addition, the video object retrieval system includes a similarity fusion and ranking module configured to carry out similarity fusion and to generate final visual search results based on similarity scores.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
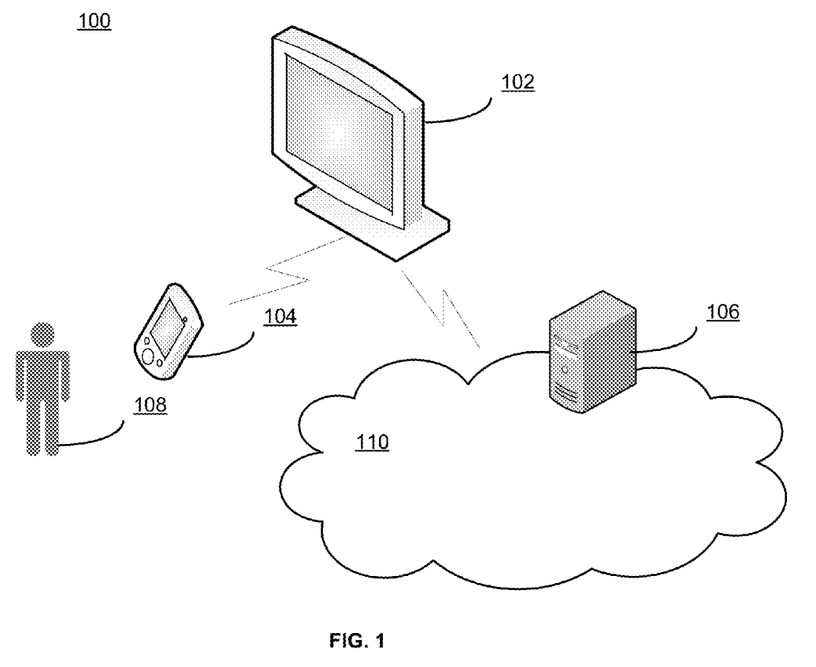
FIG. 1 illustrates an exemplary environment incorporating certain embodiments of the present invention.

FIG. 1 illustrates an exemplary environment 100 incorporating certain embodiments of the present invention. As shown in FIG. 1, environment 100 includes a television set (TV) 102, a remote control 104, a server 106, a user 108, and a network 110. Other devices may also be included.

TV 102 may include any appropriate type of TV, such as plasma TV, LCD TV, projection TV, non-smart TV, or smart TV. TV 102 may also include other computing system, such as a personal computer (PC), a tablet or mobile computer, or a smart phone, etc. Further, TV 102 may be any appropriate content-presentation device capable of presenting multiple programs in one or more channels, which may be controlled through remote control 104.

Remote control 104 may include any appropriate type of remote control that communicates with and controls the TV 102, such as a customized TV remote control, a universal remote control, a tablet computer, a smart phone, or any other computing device capable of performing remote control functions. Remote control 104 may also include other types of devices, such as a motion-sensor based remote control, or a depth-camera enhanced remote control, as well as simple input/output devices such as keyboard, mouse, voice-activated input device, etc.

Further, the server 106 may include any appropriate type of server computer or a plurality of server computers for providing personalized contents to the user 108. The server 106 may also facilitate the communication, data storage, and data processing between the remote control 104 and the TV 102. TV 102, remote control 104, and server 106 may communicate with each other through one or more communication networks 110, such as cable network, phone network, and/or satellite network, etc.

The user 108 may interact with TV 102 using remote control 104 to watch various programs and perform other activities of interest, or the user may simply use hand or body gestures to control TV 102 if motion sensor or depth-camera is used by TV 102. The user 108 may be a single user or a plurality of users, such as family members watching TV programs together.

Figure 2:
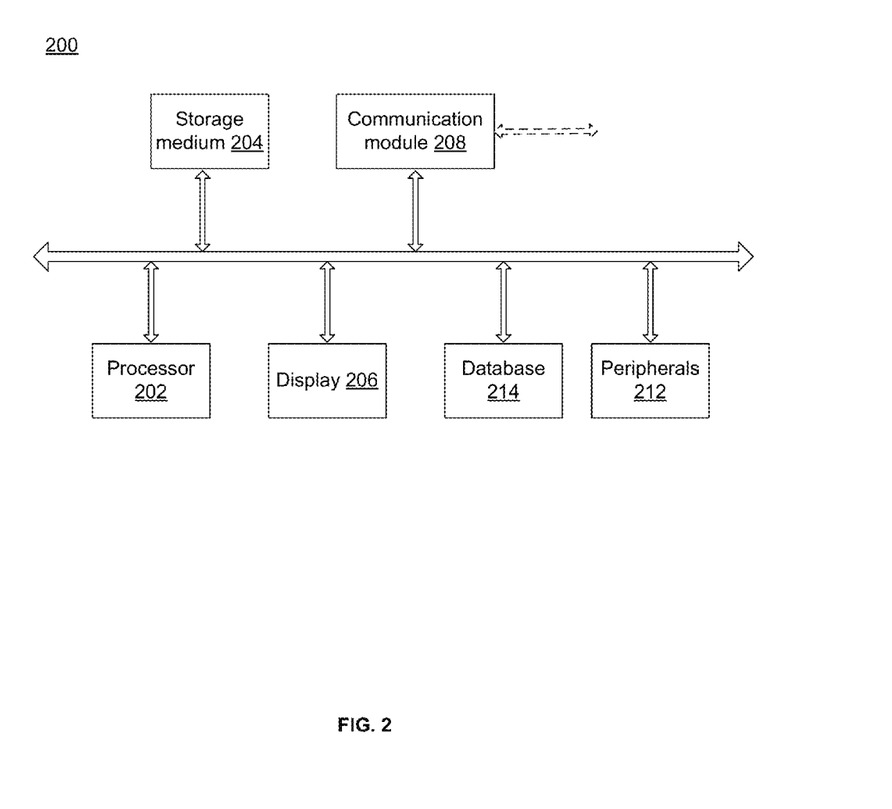
FIG. 2 illustrates an exemplary computing system consistent with the disclosed embodiments.

TV 102, remote control 104, and/or server 106 may be implemented on any appropriate computing circuitry platform. FIG. 2 shows a block diagram of an exemplary computing system capable of implementing TV 102, remote control 104, and/or server 106.

As shown in FIG. 2, the computing system 200 may include a processor 202, a storage medium 204, a display 206, a communication module 208, a database 214, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 214 may include one or more databases for storing certain data and for performing certain operations on the stored data, such as database searching.

Figure 3:
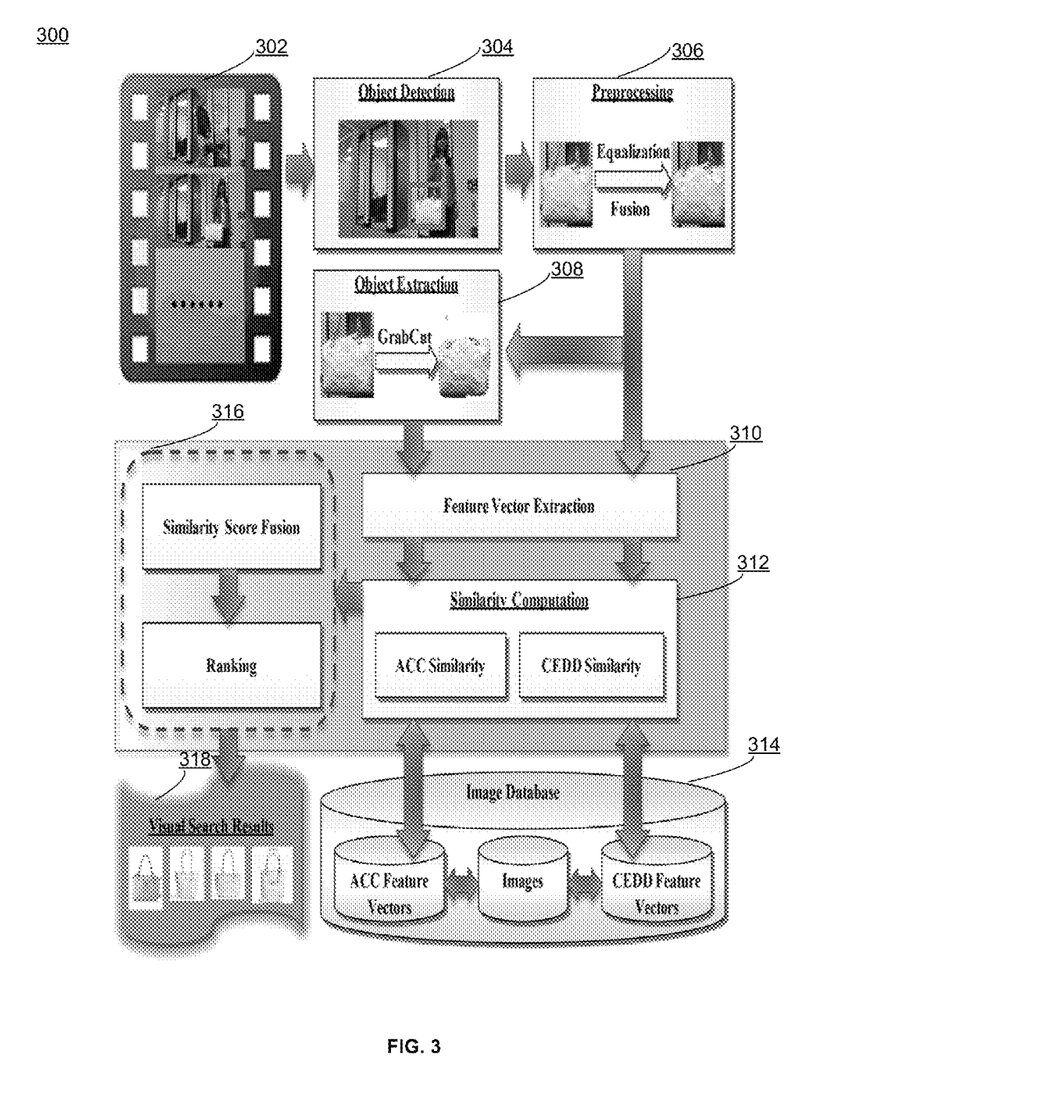
FIG. 3 illustrates an exemplary automatic object retrieval system consistent with the disclosed embodiments.

TV 102, remote control 104, and/or server 106 may implement a video object retrieval system for searching personalized items for user 108. FIG. 3 illustrates an exemplary automatic object retrieval system 300 consistent with the disclosed embodiments.

As shown in FIG. 3, the automatic object retrieval system 300 includes video content 302, an object detection module 304, a preprocessing module 306, an object extraction module 308, an object-level feature extraction module 310, a similarity computation module 312, an image database 314, a similarity fusion and ranking module 316 and visual search results 318. Certain components may be omitted and other components may be added. The system 300 (e.g., the various components) may be implemented in hardware, software, or a combination of hardware and software.

The video content 302 may include any appropriate type of source for video contents and may contain various video sources. The contents from the video content 302 may include both video data and metadata. Plurality of frames may be associated with the video content 302 and may be provided to other modules for processing. A single picture may also be included.

The object detection module 304 may be configured to detect possible object occurrences in each video shot, including related-class detection and target-class detection. That is, the object detection module 304 may automatically detect a current region of interest such that the user can specify the object that he/she is exploring in substantial less amount of time. The object detection module 304 may reside within TV 102 or outside the TV 102 depending on particular applications.

The preprocessing module 306 may be configured to preprocess object bounding box images. For example, the preprocessing module 306 can adjust the global contrast of an image through histogram equalization operation and to balance between image quality and global contrast level through image fusion.

The object extraction module 308 may be configured to perform automatic object extraction via automatic grab-cut algorithm. The object-level feature extraction module 310 may be configured to perform object-level feature extraction for both auto color correlogram (ACC) and color and edge directivity descriptor (CEDD) features.

The similarity computation module 312 may be configured to compute the ACC feature similarity and the CEDD feature similarity. Further, the image database 314 may include any appropriate database to store video data and/or the metadata of the video data, auto color correlogram (ACC) feature vectors, color and edge directivity descriptor (CEDD) feature vectors, etc.

After the object detection and feature extraction are done, the similarity fusion and ranking module 316 may be configured to carry out similarity fusion and to generate final visual search results 318 based on similarity scores. The similarity fusion and ranking module 316 can be further divided into a similarity score fusion sub-module 3162 and a ranking sub-module 3164.

The similarity score fusion sub-module 3162 may be configured to carry out similarity fusion. The ranking sub-module 3164 may be configured to rank the objects based on the calculated similarity score. A list of search results are revised and re-ranked by the ranking submodule 3164. That is, based on information from the similarity score fusion submodule 3162, the ranking submodule 3164 may generate the final visual search results 318 for the user.

Figure 4:
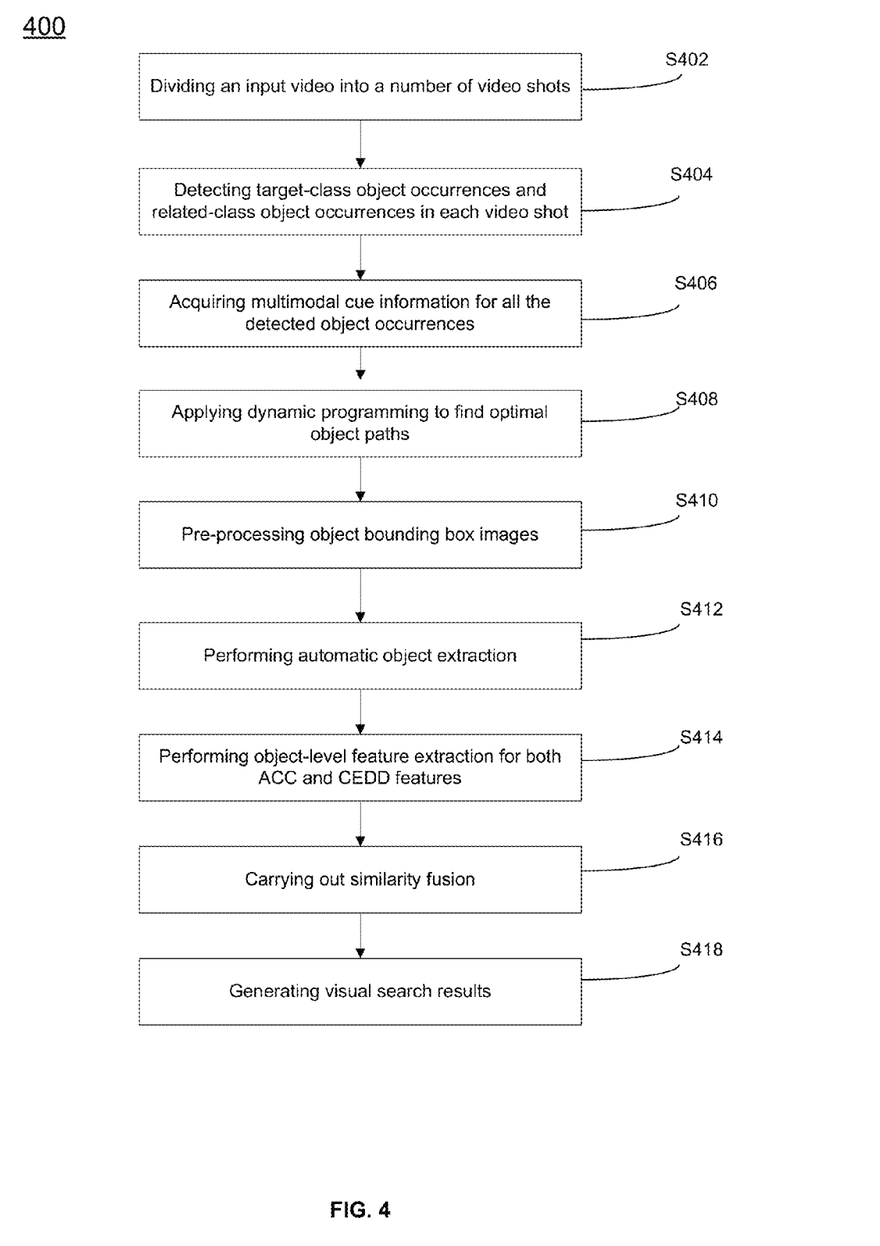
FIG. 4 illustrates a flow chart of an exemplary process performed by the various modules in the automatic object retrieval system consistent with the disclosed embodiments.

FIG. 4 illustrates a flow chart of an exemplary process performed by the various modules in the automatic object retrieval system consistent with the disclosed embodiments. As shown in FIG. 4, at the beginning, an input video is divided into a number of video shots (S402).

Possible object occurrences are detected in each video shot (S404). That is, after the video shots have been obtained, objects in the video shots may be detected. For example, two object detectors may be utilized in S404 to perform object detection. One object detector detects objects of target object class, and the other object detector detects objects of related object class. These two object detectors may also be plugged into the system.

Assuming that D is a video sequence $\{F_i\}$, i=1, ..., N, where N denotes the number of frames in the sequence, and $F_i$ denotes the $i^{th}$ video frame, C is a class of objects, that is, the target object class; and M is the total number of object occurrences of class C in D. D is divided into shots $\{S_i\}$, i=1, ..., K.

Further, multimodal cue information is acquired for all the detected object occurrences (S406). An object occurrence is an appearance of a "real" object in some frame F in D. O and O* denote an object occurrence and a real object, respectively. Then, the problem is to find all object occurrences $\{O_j\}$ of class C that appear in D, where j=1, ..., M. Each object occurrence $O_j$ consists of the tuple (i, $l_j$, $s_j$), where i is the index of the frame where $O_j$ appears, $l_j$ is the position of $O_j$ in $F_i$, and $s_j$ is the size of $O_j$ expressed by the width and height values of its bounding box.

All object occurrences of class C are detected in each shot $S_i$ by using appearance, spatio-temporal, and topological cues related to the target object class C. Other criteria may also be used.

More specifically, to obtain all object occurrences of class C in some $S_i$, the best path an object O* can follow across shot $S_i$ is analyzed, where each object occurrence in the path is one of the M object occurrences of class C in D. The rationale behind the method is that an analysis of the path of an object O* in a shot can eliminate false positive object occurrences. It may be assumed that the shot-boundary method employed for this task will not fragment a continuous scene into many separate shots because the video is divided into shots.

The analysis of an object's path in a shot may be based on appearance, spatio-temporal, and topological cues. The appearance cue refers to the visual appearance of the target object class, i.e., how much influence has the visual appearance of the object in determining its class. In contrast, the spatio-temporal and topological cues refer to relations the target object class has with a related object class. Here, an implicit requirement is that the related object class must be easier to detect in the sense there is a mature technology that robustly detects objects of such a related class.

The topological relationship constricts the possible locations for target-class object occurrences with respect to locations of related-class object occurrences. In the described video example, a girl is carrying a bag, there is a clear positional relationship between the girl's face and the bag. Bounding boxes depict object occurrences for the target object "bags" and the related object class "faces". Based on this topological relationship, the position of the girl's face is used to restrict the possible locations for the bag. Furthermore, the succession of consecutive frames in the video creates a spatio-temporal correlation between consecutive positions of a target-class object and consecutive positions of a related-class object.

Obtained by training an object detector to detect objects of the target class, the appearance cue is defined by the conditional probability P(O|C). The trained object detector must provide P(O|C) as well as the location and size for a detected object O.

The spatio-temporal and topological cues restrict the path an object O* can take in a given shot with respect to a detected related-class object R* in the shot. Searching the "best" path O* can follow with respect to R* in a succession of frames $\{F_k\}$, k=1, . . . , T, according to spatio-temporal and topological constraints. Assuming $O^j$ denotes an object occurrence in frame $F_j$ of the succession, and $\{O_i^j\}$ denotes the set of object occurrences in $F_j$, then a desired path for object O* to follow in $\{F_k\}$ exhibits the following characteristics.

First, a high probability based on the appearance cue can be specified as requiring that object occurrences $O^j$ in the path have a high conditional probability $P(O^j|C)$, and consecutive object occurrences in the path have a high appearance correlation. The appearance correlation of consecutive object occurrences is defined by:

$$\Omega(O^k, O^j) = \begin{cases} 0 & \text{if } i = 0 \\ c(v(O^i) \cdot v(O^j)) & \text{otherwise} \end{cases} \quad (1)$$

where i≠j, and v(.) is the 1-d feature vector representation of an object occurrence's bounding box; c(.) is a function that measures the correlation between two 1-d feature vectors, and the image of c(.) is [0,1]. For example, c(.) could be the Pearson product-moment correlation coefficient or the cosine similarity mapped to [0,1].

Second, a similar within-path deviation in the trajectories of O* and R* is specified by the spatio-temporal cue. Such constraint is defined by:

$$\Gamma(O^i, O^j) = \qquad (2)$$
$$\begin{cases} 0 & \text{if } i = 0 \\ 1 - \frac{\min(\|l(O^i) - l(O^j)\|_2, \|l(R^i) - l(R^j)\|_2)}{\max(\|l(O^i) - l(O^j)\|_2, \|l(R^i) - l(R^j)\|_2) + c} & \text{otherwise} \end{cases},$$

where i≠j, and ϵ is a constant greater than zero to avoid divisions by zero. The function l(.) represents the location of an object, $\|.\|_2$ is the $L_2$ norm. Γ(.) may be extended to include also the relationship between the sizes of the bounding boxes of the target-class and related-class objects, similarly to how within-path deviations are defined.

Third, each object occurrence in the path should not deviate from the constricted locations specified by the topological cue. This requirement is defined by a function Ψ(.) that depends on the topological relationship between specific related and object classes. With respect to the example of detecting bags in the video shots, the detected target-class object (bag) should not be located more than a certain parameter distance from the location of the related object (face). To detect the target object in the video shots, the function Ψ(.) is defined by:

$$\Psi(O^i) = \max\left(0, \frac{\|l(O^i) - l(R^i)\|_2}{\max(\|l(O^i)\|_2, \|l(R^i)\|_2)} - \theta_t\right). \qquad (3)$$

where $\theta_t$, $0 \le \theta_t < 1$, is the distance constraint between the target and related objects.

Based on these desired characteristics for a desired path for an object O*, a desired path would require having larger $\sum_{i=1}^{T} P(O^i | C)$, smaller $\sum_{i=1}^{T} \Gamma(O^{i-1}, O^i)$, larger $\sum_{i=1}^{T} \Omega(O^{i-1}, O^i)$, and smaller $\sum_{i=1}^{T} \Psi(O^i)$.

Hence, the problem of finding the best path for the "real" object O* can be formalized into an optimization problem by:

$$\text{minimize } \Phi = \sum_{i=1}^{T} \{\gamma_1 \Gamma(O^{i-1}, O^i) + \gamma_2[1 - P(O^i | C)] + \qquad (4)$$
$$\gamma_3[1 - \Omega(O^{i-1}, O^i) + (1 - \gamma_1 - \gamma_2 - \gamma_3)\Psi(O^i)\},$$

where $\gamma_1$, $\gamma_2$, and $\gamma_3$ are weighting parameter between [0, 1] such that $\gamma_1+\gamma_2+\gamma_3=1$; and the image of Γ(.), Ω(.), and Ψ(.) is [0,1].

The optimal solution of this optimization problem can be solved via a dynamic programming procedure, assuming the selection of current target object is independent from the previously selected objects (S408).

With unconstrained lighting conditions and video recording environment, even the same object in different videos may appear in a variety of poses, colors, occluding situations and so on. In addition, the video quality would be another concern for effective object retrieval. Therefore, a necessary pre-processing procedure is required for the bounding box image containing the detected object.

Further, the object bounding box images are pre-processed (S410). First, histogram equalization is performed. The histogram equalization may adjust the global contrast of an image for enhancing the bone structure in the image and reveal more details, especially when the usable data of the image is represented by close contrast values. Through this adjustment, the intensities can be better distributed on the histogram. This allows for areas of lower local contrast to gain a higher contrast. Histogram equalization accomplishes this by effectively spreading out the most frequent intensity values. For color images, the operation is applied to the luminesce channel in the HSV color space. The HSV stands for the Hue, Saturation, and Value based on the artists (Tint, Shade, and Tone). A way of making the same colors is to use their Hue (X axis), their Saturation (Y axis), and their brightness Value (Z axis). The Value represents intensity of a color, which is decoupled from the color information in the represented image. The hue and saturation components are intimately related to the way human eye perceives color resulting in image processing algorithms with physiological basis. The probability of an occurrence of an intensity level i in the image is defined by:

$$p(i) = \frac{\text{number of pixels with intensity } i}{\text{total number of pixels in an image}} \qquad (5)$$

where i=0, 1, . . . , L−1; L is a total number of gray levels in the image; and p(i) is in fact the image's histogram for pixel value i, normalized to [0,1].

The operation of equalization is equivalent to transforming the pixel intensity value i to the new one by using the following function:

$$T(i) = \text{floor}((L-1)Cdf(i)) \qquad (6)$$

where $Cdf(i) = \sum_{j=0}^{i} p(j)$ is the cumulative distribution function, which is also the image's accumulated normalized histogram.

Then, image fusion is carried out. The equalization operation enhances the contrast of background noise, while decreasing the usable signal. To balance between image quality and global contrast level, the image fusion is carried out to generate more smoothed results.

Figure 5:
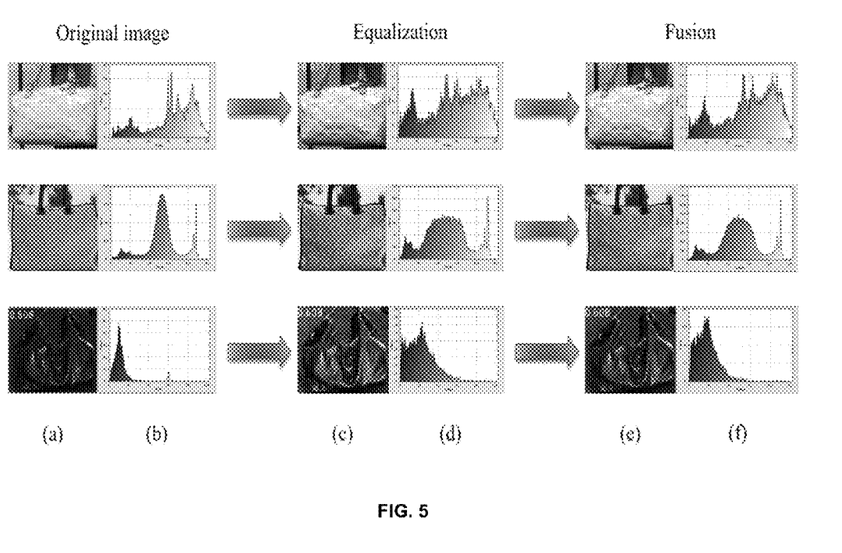
FIG. 5 illustrates an exemplary object bounding box image pre-processing procedure consistent with the disclosed embodiments.

FIG. 5 illustrates an exemplary object bounding box image pre-processing procedure consistent with the disclosed embodiments. As shown in FIG. 5, for the exemplary task of detecting bags in video shots, the target object class is "bags". The histogram is the most commonly used structure to represent any global feature composition of an image. The original bounding box images and the corresponding histograms are displayed in columns (a) and (b), respectively. After histogram equalization is performed, the equalized images in columns (c) have better contrast and carry more details, and the corresponding intensity histograms in column (d) prove the uniform distribution of intensity distribution within the same range. The original bounding box images and the equalized images are taken as the two input sources for image fusion. The fusion strategy is the pixel-wise weighted averaging. The fused images and the corresponding histograms are displayed in columns (e) and column (f), which render more smoothed results by supplying complementary information.

Returning to FIG. 4, the object extraction from bounding box image is based on the popular grab-cut algorithm. Different from the traditional grab-cut approach which requires human interaction to provide initial bounding box for interested object and refine segmentation results, the object extraction is automatically performed (S412). The automatic object extraction is automatically performed without user intervention by taking advantage of the object detection results in the following ways. The pre-processed bounding box image with user interested object is fed as input; on the other hand, the segmentation process is initialized by assigning boundary pixels as background.

Being initialized with some background pixels, the grab-cut algorithm iteratively finds a binary segmentation (foreground and background) of an image by formulating an energy minimization scheme using color information, which is modeled by a full covariance of Gaussian Mixture Models (GMMs) with K components for foreground and background respectively. The Gaussian Mixture Model (GMM) is a parametric probability density function represented as a weighted sum of Gaussian component densities. The GMMs are parameterized as $$\Theta = \{\pi(\alpha,k), \mu(\alpha,k), \Sigma(\alpha,k), \alpha \in \{0,1\}, k=1, \ldots, K\} \qquad (7)$$

where $\pi$, $\mu$, and $\Sigma$ are the weights, means, and covariance matrices of the model; and $\alpha \in \{0, 1\}$ is a label indicator denoting whether a pixel in an image I (video frame) belongs to the foreground ($\alpha_i=1$) or background ($\alpha_i=0$). Let $k = \{k_1, \ldots, k_i, \ldots, k_N\}$, $k_i \in \{1, \ldots, K\}$, $1 \le i \le N$, indicating the component of the foreground/background GMM (according to $\alpha_i$) the pixel $z_i \in I$ belongs to.

The energy function for segmentation is defined by:

$$E(\alpha,k,\theta,z) = U(\alpha,k,\theta,z) + V(\alpha,z) \qquad (8)$$

where U is the region component, being the penalty of assigning a pixel to foreground/background determined by the probability distributions p(.) of the GMM $$U(\alpha,k,\theta,z) = \Sigma_i -\log(p(z_i|\alpha_i,k_i,\theta)) - \log(\pi(\alpha_i,k_i)) \qquad (9)$$

and V is the edge component, representing a regularizing prior assuming that segmented regions should be coherent in terms of color, taking into account a neighborhood C around each pixel $$V(\alpha, z) = \gamma \sum_{\{m,n\} \in C} [\alpha_n \ne \alpha_m] \exp(-\beta \|z_m - z_n\|^2). \qquad (10)$$

Let T be a trimap consisting of three regions $T_F$, $T_B$ and $T_U$, containing initial foreground, background, and uncertain pixels respectively. Given the energy minimization scheme described, the grab-cut tries to label the pixels in $T_U$ by using a minimum cut method.

The final automatic object extraction algorithm that outputs segmented foreground object and background is summarized in the following steps.

Step 1: the trimap T with object rectangle is initialized.
Step 2: $\alpha_i=0$ for $i \in T_B$ and $\alpha_i=1$ for $i \in T_U \cup T_F$ are initialized.
Step 3: the foreground and background GMMs with k-means from sets $\alpha_i=1$ and $\alpha_i=0$ are initialized, respectively.
Step 4: pixels are assigned to GMM components and GMM parameters are learned from data z.
Step 5: segmentation based on graph-cut is estimated.
Step 6: the operations are repeated from Step 4 until convergence.

To effectively utilize the object segmentation results, object-level feature extraction for both auto color correlogram (ACC) and color and edge directivity descriptor (CEDD) features is performed (S414).

The logical image description includes color, texture, shape, and spatial attributes. Color attributes may be represented as a histogram of intensity of the pixel colors. Traditional color histograms are built on the statistical distribution of image pixels without considering any spatial information, which would fail to distinguish two images with the same color distribution but totally different semantics. To tackle this problem, the auto color correlogram (ACC) algorithm is proposed, which takes into consideration both spacial and statistical information, being able to describe embedded object-level concept in a better way.

Let I(x, y) represents image I with x and y being the coordinates. There are n preset colors denoted as $C_1$, $C_2$, . . . , $C_n$. Let the distance between two identical colors in the image be d∈{$d_1$, $d_2$, . . . , $d_m$}, ACC method tries to construct a P histogram with dimension n×m, where each bin Bin ($C_i$; $d_j$)=$\Sigma_{(x,y),(x',y')}${||I(x,y,$C_i$)–I(x',y',$C_i$)||=$d_j$}, 1≤i≤n, 1≤j≤n, representing the number of pixel pairs ((x, y),(x', y')) with the same color $C_i$ and distance $d_j$.

The color and edge directivity descriptor (CEDD) is a popular compact composite descriptor which incorporates both color and texture features in a histogram. Texture is visual patterns in images and how they are spatially defined. The size of CEDD is limited to 54 bytes per image, making this descriptor suitable for large image databases. First, the image is separated in a preset number of blocks and a color histogram is computed over the HSV color space. A set of fuzzy rules are applied to obtain a 24-bins histogram (representing different colors). Then five digital filters are used to extract the texture information related to the edges presented in the image. Those filters are able to characterize the edges as one of the following types: vertical, horizontal, 45-degree diagonal, 135-degree diagonal and non-directional edges. Finally, the CEDD histogram is composed of 6×24=144 regions, where the 6 regions are determined by the texture component and the 24 regions are originated from the color component.

Figure 6:
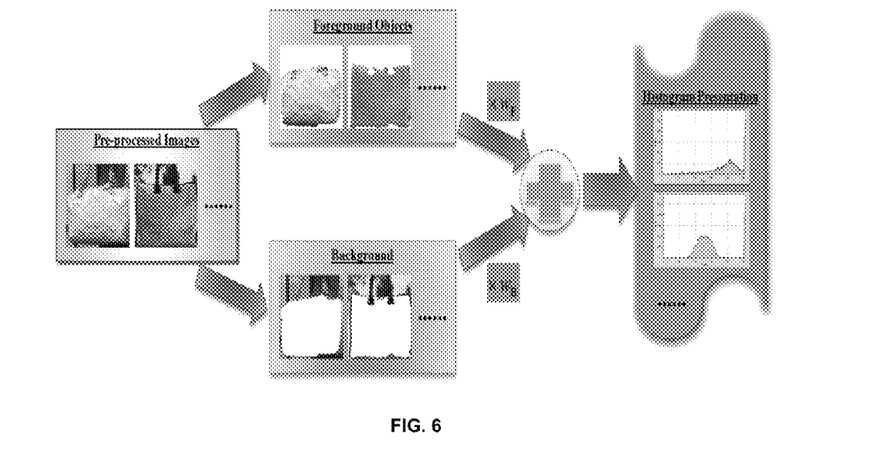
FIG. 6 illustrates an exemplary image feature extraction procedure consistent with the disclosed embodiments.

FIG. 6 illustrates an exemplary image feature extraction procedure consistent with the disclosed embodiments. As shown in FIG. 6, for the exemplary task of detecting bags in video shots, the target object class is "bags". The pre-processed images are taken as input sources for image feature extraction. The image feature extraction procedure applies an importance weight to each of the pixels in foreground ($w_F$) and background ($w_B$) and obtains the final fused feature vector, $w_F$>>$w_B$, $w_F$>0, $w_B$>0. Finally, histograms are presented as output results shown on the right side of FIG. 6 after the object-level feature extraction procedure is performed. Histograms are useful for indexing and retrieving images.

It should be noted that the determination of $w_F$ and $w_B$ are application dependent. For example, under the unconstrained video condition, $w_B$ should be minimized to diminish the effect of noisy background; however if the interested object (e.g., a horse) is usually highly related with background (e.g., grass), hence $w_B$ should increase.

The ACC feature dissimilarity is calculated based on Manhattan distance. The Manhattan distance ||p−q||$_1$ between two feature vectors p, q in an n-dimensional real vector space with fixed Cartesian coordinate system, is the sum of the length of the projections of the line segment between the points onto the coordinate axes. The ACC feature dissimilarity is defined by:

$$D_{pq} = \frac{\|p-q\|_1}{\max\{D_{pq}\} + \xi}, \tag{11}$$

where ξ is a constant greater than zero for avoiding division by zero.

The CEDD feature dissimilarity is measured by Tanimoto coefficient. The CEDD feature dissimilarity is defined by:

$$T_{pq} = \frac{p^T q}{p^T p + q^T q - p^T q}, \tag{12}$$

where p and q are two feature vectors; the transpose of the vector p is $p^T$; and the transpose of the vector q is $q^T$.

Further, similarity fusion is carried out (S416). A similarity score is defined by:

$$Sim_f(p, q) = \alpha \cdot Sim_{ACC}(p, q) + \beta \cdot Sim_{CEDD}(p, q) \tag{13}$$

$$= \alpha \cdot (1 - D_{pq}) + \beta \cdot (1 - T_{pq}) \tag{14}$$

where α and β are the corresponding weights for each type of feature.

Returning to FIG. 4, after carrying out similarity fusion, visual search results based on the similarity scores are generated (S418). The search results may also presented to the user in various display formats. For example, the visual search results may be displayed overlapping the existing displays or may be displayed on a separate display region such as bottom of the display screen. In addition, the visual results may also be displayed on a different terminal other than the current display terminal or screen.

The disclosed video object retrieval method and system can automatically extract video object from complex background and conduct efficient object retrieval by fusing spatial color and texture information. Furthermore, the probabilistic framework to generate the visual search results is a generative model. The disclosed systems and methods are suitable for extracting automatically human interested objects from complex background in practical application. It should be noted that, the concept for the video object retrieval systems and methods can be extended to other services. For example, with support of the object retrieval system, a user spends less time in searching for products that he/she desires in TV shopping service. The disclosed systems and methods can also be extended to other devices with displays, such as cell phones, tablets, PCs, watches, and so on, to enable a unique user interaction experience. Other applications, advantages, alternations, modifications, or equivalents to the disclosed embodiments are obvious to those skilled in the art.

What is claimed is:
1. A video object retrieval method, comprising:
dividing an input video into a number of video shots;
detecting target-class object occurrences and related-class object occurrences in each video shot;
pre-processing object bounding box images;
performing automatic object extraction via an automatic graph-cut algorithm:
performing object-level feature extraction and integration; and
generating visual search results based on similarity scores.
2. The method according to claim 1, wherein detecting target-class object occurrences and related-class object occurrences in each video shot further including:
acquiring multimodal cue information for all the detected object occurrences;

combining an appearance cue, a spatio-temporal cue, and a topological cue to aid object detection in a plurality of video shots; and applying dynamic programming to find optimal object paths.

3. The method according to claim 1. wherein pre-processing object bounding box images further including:

performing histogram equalization to adjust global contrast of an image; and carrying out image fusion to balance between image quality and global contrast level.

4. The method according to claim 1, wherein performing automatic object extraction further including:

initializing a trimap T with object rectangle consisting of a foreground, region $T_F$, a background region $T_B$ and an uncertain pixel region $T_U$;

initializing background ($\alpha_i=0$) for $i \in T_B$ and foreground ($\alpha_i=1$) for $i \in T_U \cup T_F$, where $1 \le i \le N$;

initializing the foreground and background Gaussian Mixture Models (GMMs) with k-means from sets $\alpha_i=1$ and $\alpha_i=0$, respectively;

assigning pixels to GMM components and learning GMM parameters from image data; and estimating segmentation based on the graph-cut algorithm.

5. The method according to claim 1, wherein performing object-level feature extraction and integration further including:

performing object-level feature extraction for both auto color correlogram (ACC) and color and edge directivity descriptor (CEDD) features; and carrying out similarity fusion.

6. The method according to claim 5, wherein:

provided that p and q are two feature vectors; $\|p-q\|_1$ is Manhattan distance between two feature vectors p and q, the ACC feature dissimilarity is defined by:

$$D_{pq} = \frac{\|p-q\|_1}{\max\{D_{pq}\} + \xi}$$

where $\xi$ is a constant greater than zero for avoiding division by zero.

7. The method according to claim 5, wherein:

provided that p and q are two feature vectors; $p^T$ is the transpose of the vector p; $q^T$ is the transpose of the vector q, the CEDD feature dissimilarity is defined by:

$$T_{pq} = \frac{p^T q}{p^T p + q^T q - p^T q}$$

wherein $p^T p + q^T q - p^T q$ is not zero.

8. The method according to claim 5, wherein:

provided that p and q are two feature vectors; $Sim_{ACC}(.)$ is the ACC feature similarity; $Sim_{CEDD}(.)$ is the CEDD feature similarity, a similarity score is defined by:

$$Sim_f(p, q) = \alpha \cdot Sim_{ACC}(p, q) + \beta \cdot Sim_{CEDD}(p, q)$$
$$= \alpha \cdot (1 - D_{pq}) + \beta \cdot (1 - T_{pq})$$

where $\alpha$ is the weight for the ACC feature; and $\beta$ is the weight for the CEDD feature.

9. A video object retrieval system, comprising:

an object detection module configured to detect target-class object occurrences and related-class object occurrences in each video shot;

a preprocessing module configured to pre-process object bounding box images;

an object extraction module configured to perform automatic object extraction via an automatic graph-cut algorithm;

an object-level feature extraction module configured to perform object-level feature extraction;

a similarity computation module configured to compute auto color correlogram (ACC) feature similarity and color and edge directivity descriptor (CEDD) feature similarity; and a similarity fusion and ranking module configured to carry out similarity fusion and generate final visual search results based on similarity scores.

10. The system according to claim 9, wherein the object detection module is further configured to:

acquire multimodal cue information for all the detected object occurrences;

combine an appearance cue, a spatio-temporal cue, and a topological cue to aid object detection in a plurality of video shots; and apply dynamic programming to find optimal object paths.

11. The system according to claim 9, wherein the preprocessing module is further configured to:

perform histogram equalization to adjust global contrast of an image; and carry out image fusion to balance between image quality and global contrast level.

12. The system according to claim 9, wherein the object extraction module is further configured to:

initialize a trimap T with object rectangle consisting of a foreground region $T_F$, a background region $T_B$ and an uncertain pixel region $T_U$;

initialize background ($\alpha_i=0$) for $i \in T_B$ and foreground ($\alpha_i=1$) for $i \in T_U \cup T_F$, where $1 \le i \le N$;

initialize the foreground and background Gaussian Mixture Models (GMMs) with k-means from sets $\alpha_i=1$ and $\alpha_i=0$, respectively;

assign pixels to GMM components and learn GMM parameters from image data; and estimate segmentation based on the graph-cut algorithm.

13. The system according to claim 9, wherein the object-level feature extraction module is further configured to:

perform object-level feature extraction for both auto color correlogram (ACC) and color and edge directivity descriptor (CEDD) features.

14. The system according to claim 13, wherein:

provided that p and q are two feature vectors; $\|p-q\|_1$ is Manhattan distance between two feature vectors p and q, the ACC feature dissimilarity is defined by:

$$D_{pq} = \frac{\|p-q\|_1}{\max\{D_{pq}\} + \xi}$$

where $\xi$ is a constant greater than zero for avoiding division by zero.

15. The system according to claim 13, wherein:
provided that p and q are two feature vectors; $p^T$ is the transpose of the vector p; $q_T$ is the transpose of the vector q, the CEDD feature dissimilarity is defined by:

$$T_{pq} = \frac{p^T q}{p^T p + q^T q - p^T q}$$

wherein $p^T p + q^T q - p^T q$ is not zero.

16. The system according to claim 13, wherein:
provided that p and q are two feature vectors; $Sim_{ACC}(.)$ is the ACC feature similarity; $Sim_{CEDD}(.)$ is the CEDD feature similarity, a similarity score is defined by:

$$\begin{aligned}Sim_f(p, q) &= \alpha \cdot Sim_{ACC}(p, q) + \beta \cdot Sim_{CEDD}(p, q) \\ &= \alpha \cdot (1 - D_{pq}) + \beta \cdot (1 - T_{pq})\end{aligned}$$

where α is the weight for the ACC feature; and β is the weight for the CEDD feature.

* * * * *